United States Patent [19]

Gérard et al.

[11] Patent Number: 4,566,092
[45] Date of Patent: Jan. 21, 1986

[54] PROCESS AND DEVICE FOR GENERATING SYNCHRONIZING SIGNALS IN AN OPTICAL DATA CARRIER WRITE-READ APPARATUS

[75] Inventors: Jean-Louis Gérard; Claude Lehureau; Marc Loret, all of Paris, France

[73] Assignee: Thomson-CSF, Paris, France

[21] Appl. No.: 473,568

[22] Filed: Mar. 9, 1983

[30] Foreign Application Priority Data

Mar. 12, 1982 [FR] France ................. 82 04219

[51] Int. Cl.⁴ .................... G11B 7/00; G11B 27/00
[52] U.S. Cl. ...................... 369/59; 369/48; 360/39; 360/41
[58] Field of Search ........... 369/59, 47, 48; 360/39, 360/41; 358/342

[56] References Cited

U.S. PATENT DOCUMENTS 3,961,315 6/1976 Yokoyama .............. 369/59 X

FOREIGN PATENT DOCUMENTS 0021411 6/1980 European Pat. Off. .
0032271 12/1980 European Pat. Off. .
2261586 2/1975 France .

OTHER PUBLICATIONS

Electronique, No. 272, Sep. 1979, Paris (FR), M. Astier et al.

Primary Examiner—Robert L. Richardson
Attorney, Agent, or Firm—Oblon, Fisher, Spivak, McClelland & Maier

[57] ABSTRACT

Process for generating synchronizing signals used for writing and/or reading recorded digital data or recording on an optical data carrier, in which the synchronizing signals are obtained from basic clock signals regenerated in phase with the aid of the determination of the phase shift of a specific pulse relative to the clock signal. According to a preferred variant, the specific data and the useful information data are coded according to the NRZ code. The specific data are associated with pulse times not used in the NRZ code for the recording of the information data. The synchronizing signals generated on the basis of the reading of these flags can then be used for writing during the information data recording phases.

11 Claims, 9 Drawing Figures

PROCESS AND DEVICE FOR GENERATING SYNCHRONIZING SIGNALS IN AN OPTICAL DATA CARRIER WRITE-READ APPARATUS

BACKGROUND OF THE INVENTION

The present invention relates to a process for generating synchronizing signals used in an apparatus for optically transcribing data on a data carrier, during the write and/or read phases and in particular digital data recorded on a disk. It also relates to an optical device for performing this process.

Recording methods are well known to the Expert and fall outside the scope of the present invention. Generally the information is recorded in the form of microreliefs along tracks having a spiral or concentric circular configuration, the latter being easier to produce in the case of recording digital data. It in particular facilitates random access to recorded data, as well as a recording divided up into blocks or sectors.

No matter what the recording method, during reading it is necessary to have signals making it possible to synchronize said reading and numerous methods are also known for this purpose.

According to a first method in multitrack systems, with each track reserved for the recording of useful data is associated at least one other track along which are recorded miscellaneous data and in particular clock signals permitting the synchronization of the reading of the useful data. According to a variant, the tracks used for synchronization purposes are preetched and have optically detectable, regularly spaced disturbances. During reading, according to a first variant (multibeam system), a first beam is focused on the useful data track used for reading the data and a second, separate beam, but which is constantly mechanically coupled to the first, is used for reading the synchronization data. In a second variant (monobeam system), a single beam reads both sets of data. In this case, it is necessary that the two data types can be easily discriminated. For example, the frequency spectra associated with said sets of data can differ. In this variant, the preetched synchronization data can also be used during the writing phase.

In order to increase the recording density, it has also been proposed to use a single track, in which case the synchronization clock signals can be derived from the actual data reading.

In order to make synchronization easier, it is conventional practice to use autosynchronizing codes or a maximum of transitions, no matter what the content of the source information to be recorded. Thus, the microreliefs have two reference levels, respectively associated with logic values "0" and "1". The synchronization signals are derived from the detection of transitions from one given level to another and are used for the frequency and phase control of an oscillator, which is conventionally a voltage-controlled oscillator or VCO, equipped with a phase lock loop or PLL. In addition, special bursts of recorded pulses are used for initializing the control.

However, this type of coding does not permit a maximum recording density. For increasing this density, it is known to use non-autosynchronizing codes, e.g. the NRZ code (non-return to zero). The feature of this type of code is that there is no transition from one data bit to the other if the said two bits remain at the same logic value. It is then more difficult to derive the signals necessary for synchronization from the reading of the thus coded data.

BRIEF SUMMARY OF THE INVENTION

The problem of the present invention is to obviate the disadvantages of the prior art, whilst retaining the possibility of a maximum recording density. Thus, the process of the invention consists of arranging in regular or irregular manner along the tracks, recorded elements used for the synchronization or flags. Obviously these flags must be "transparent" to the electronic circuits used for detecting and processing the useful data. These synchronization samples are used for resynchronizing the synchronizing signal generating circuits whenever a flag passes underneath a read head.

Thus, the invention specifically relates to a process for generating synchronizing signals in an optical apparatus for the recording—reading of digital data on a carrier which performs a uniform movement, said data being recorded in the form of disturbances of at least one layer of material of the carrier and which are optically detectable along the tracks of a given configuration, said apparatus having means for focusing at a scanning spot a light energy beam on one of the said tracks and optoelectronic means for detecting the interaction of said beam with the disturbances passing beneath the scanning spot, wherein the process comprises the stages of recording specific digital data in the form of a sequence of disturbances of said layer of material at given locations on said tracks selectively identifiable by optoelectronic detection means, generating a periodic clock signal at a fixed frequency, selective identification of the specific digital data by the optoelectronic detection means, determination of the time of passage of one of the said disturbances forming the specific digital data in the scanning spot, determination of the displacement of this time with a reference time of the clock signal period and generation of a synchronizing signal of the same frequency as the clock signal and having a phase shift which is directly proportional to said displacement.

The invention also relates to an apparatus for performing this process.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

Figure 1:
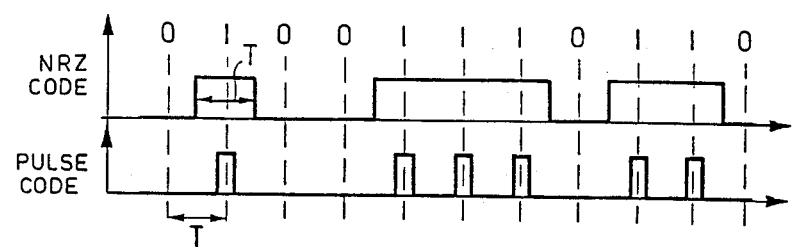
FIG. 1 two types of code used for coding the same binary word.

Processes for recording data on an optical disk are well known. Generally the disk has at least one layer, generally a surface layer, made from a material sensitive to certain types of radiation. According to one of the best known processes, during recording, a beam generated by a laser source is directed on to the layer of material and microreliefs are produced along the tracks by a thermooptical effect. These tracks can be virtual, i.e. they can be created at the time of recording the data, or can be preetched in a random form. The processes for reading such data and following the track are also known. The track is followed either by using a second reading beam, or the beam used for recording or writing purposes, or once again the same beam can fulfil all the functions. The interaction of this beam with microreliefs passing beneath the read head produces interference orders, which are detected by optoelectronic detection means. Reading can take place either by transmission through the disk and detection with the aid of photodetecting cells, placed in the vicinity of the lower face of the disk, or by reflection of the radiation on the disk and reverse return of the light taken up by the optical systems comprising mirrors directing the reflected beams towards photodetecting cells.

Apart from radial following or tracking, the photodetecting cells can also be used for ensuring a correct focusing of the reading beam on the recorded face. Finally, these cells are used for generating electrical signals representing the recorded data.

For applications in the informatics field, it is necessary to be able to record digital data in a random manner and at a random point on the disk. In addition, random access to the data is required during reading. Another requirement of this type of device is that the reading must by synchronized with the writing. However, for numerous reasons connected with parasitic phenomena such as speed fluctuations, an external clock is inadequate for this purpose. Thus, the synchronizing signals must be directly derived from the recorded data, so as to have a correlation between the read data and the recorded data.

In practice, the microreliefs are in the form of disturbances along the tracks associated with two clearly defined levels and separated by transitions between these two levels. The intertrack areas are uniform and the surface thereof is at one of these levels. The detection means translate these level variations by a pulse sequence also having two states and which can be associated with logic states 0 and 1, whilst having more or less abrupt transitions between these two states.

In the prior art, it is conventional practice to derive synchronizing signals from the appearance of one of these transitions, e.g. a rising front or a falling front. For this purpose, it is conventional practice to use autosynchronizing codes or at least codes having a maximum of transitions, as stated hereinbefore. However, when it is desired to increase the recording density, it is standard practice to use other types of code, e.g. the NRZ code (non-return to zero).

FIG. 1 illustrates two types of code, namely the pulse code and the NRZ code for a random multibit binary word having the following logic states: 01001110110. It is immediately apparent from FIG. 1 that the pulse code has many more transitions than the NRZ code. It is consequently more difficult to derive from the latter data for the synchronization. Period T represents the duration of an elementary binary signal or bit, which corresponds to a clock frequency $f = 1/T$. It is also not possible to use an auxiliary track reserved for the synchronization, which would therefore destroy the density gain made possible by the NRZ code.

In order to obviate the aforementioned difficulties, the present invention relates to a process, whose main feature is to derive the signals necessary for the synchronization of the writing and/or reading of digital data on an optical data carrier, from specific digital data or flags, recorded on the track common to the digital information data, but which are spatially multiplexed therewith.

These flags can be recorded prior to any recording of useful information and are then used for generating synchronizing signals during the subsequent recording of information and during successive reading operations. Alternatively they are multiplexed in time with the recording of said information and are used during the subsequent reading thereof.

Figure 2:
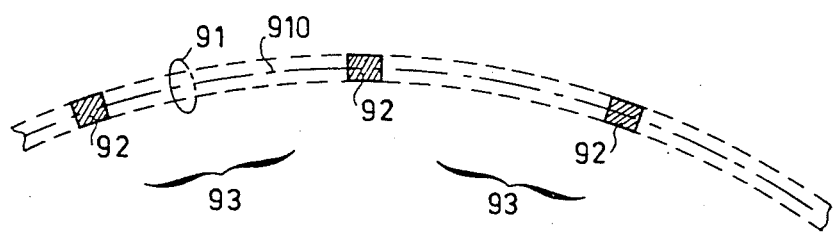
FIG. 2 diagrammatically the configuration of a track of a data carrier according to the invention.

FIG. 2 illustrates an arrangement according to the invention showing a portion of one of the tracks 91 of a disk of mean axis 910. In this case, the tracks are circular and along them are recorded flags 92, according to the main feature of the invention.

It is necessary for the specific digital data representing these flags to be selectively identifiable so as not to generate synchronizing signals only correlated with the appearance of the specific flags, whilst they must also be "transparent", for the useful data processing circuits.

Therefore, when using a NRZ code of the type shown in the upper part of FIG. 1, the specific flags are recorded in the form of pulses, whereof time intervals separating fronts of the same nature are forbidden in the modulation code. For the NRZ code, the durations T and integral multiples of T are used. A time equal to the shortest half-integral time, i.e. 1.5 T is used for the specific pulses recorded.

Figure 3:
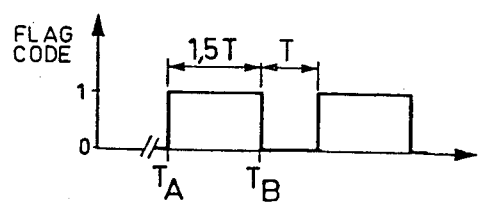
FIG. 3 a diagram illustrating a special code used in a preferred variant of the invention.

Such a pulse is illustrated by the diagram of FIG. 3. A first part is at logic 1 during interval equal to 1.5 T, time interval $T_A$-$T_B$ and at logic 0 during the time interval equal to T, interval $T_B$-$T_C$.

Two special situations can be differentiated. The first is the case when the disk is preetched, i. it has flags recorded prior to any recording of useful digital data. According to a preferred variant, the recording of these flags along the tracks is periodic and the spaces left free between the flags defined are data blocks or sectors and in this case it is possible to obtain a completely synchronous operating mode.

The second case is that in which the flags are recorded at the same time as the useful digital data. As hereinbefore, the flags can be recorded regularly or irregularly spaced specific locations, or can be recorded in multiplexed manner with useful digital data.

A preferred variant of the process according to the invention will now be described in greater detail relative to the device shown in the flow chart of FIG. 4. Optoelectronic detection means and the associated electronic circuits 1 supply a reading signal $V_L$ transmitted on the one hand to conventional read data processing circuit 6 and on the other to the specific circuits of the present invention.

According to the process of the invention, it is firstly necessary to determine whether the signals $V_L$ have resulted from the reading of useful information or the reading of flags serving for synchronization. This stage is performed by means of flag detectors, which will be described hereinafter. These flag detectors supply an authorization signal $V_A$ transmitted to phase shift calculators 3. According to the main feature of the invention, the latter have the function of supplying data $\Delta\phi$ representing the time at which there is a transition of a given direction of the microrelief passing underneath the reading spot. The authorization signal $V_A$, e.g. after logic inversion $\overline{V}_A$ by inverter 7, can be used for the inhibition—authorization of the operation of read data processing circuits 6.

The device also has clocks 4 generating synchronizing pulses H regenrated by circuits 5, i.e. the phase is corrected and transmission takes place in the form of a resynchronized signal $H_S$ to the read data processing circuits. Clocks also supply the phase shift calculator 3 with reference clock signals $H_R$ and signals H. In a conventional manner, these clocks comprise a quartz-controlled oscillator having a high degree of stability.

The relative speed between the data carrier-read or write head is defined with sufficient accuracy by a reproducible law, e.g. constant angular speed for a disk.

In this case, during the reading phases, the frequency and phase of the synchronizing signals $H_S$ are generated on the basis of phase data extracted from the detected flags.

In a configuration of periodic flags, the bit timing, i.e. the frequency of clock H is regenerated on the basis of the timing of the blocks, i.e. with the timing of the detection of the flags (successive passages under the read head). For this purpose, signal $V_A$ is also transmitted to clocks 4.

The phase correction by circuits 5 is performed with the aid of data $\Delta\phi$ supplied by the flag detectors 2.

Furthermore, if the bit timing of the read useful digital data is very stable, i.e. if the phase sliding per block (between two flag passages) is less than a fraction of a bit (time sliding less than a predetermined fraction of time interval T), the frequency regeneration operation is not necessary. This can be obtained by controlling the relative read and/or write head-carrier speed by means falling outside the scope of the invention.

Figure 4:
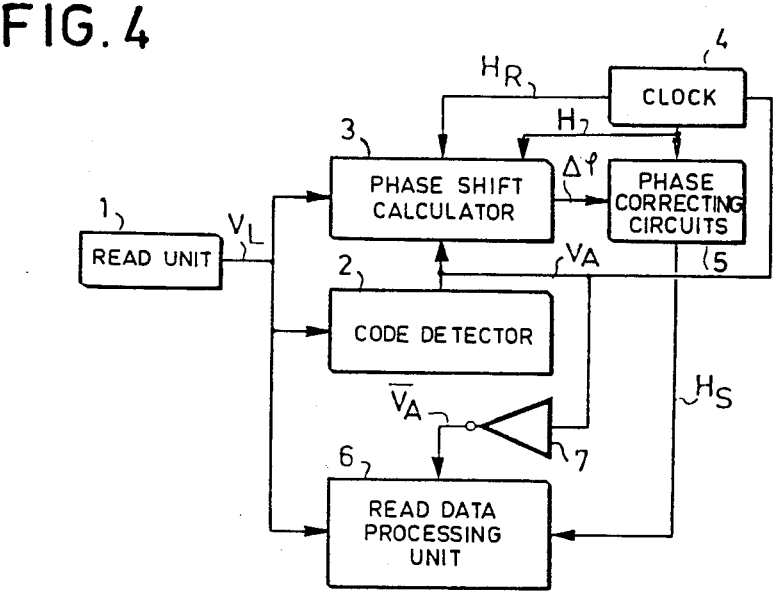
FIGS. 4 and 5 flow charts of devices according to two variants of the invention.
Figure 5:
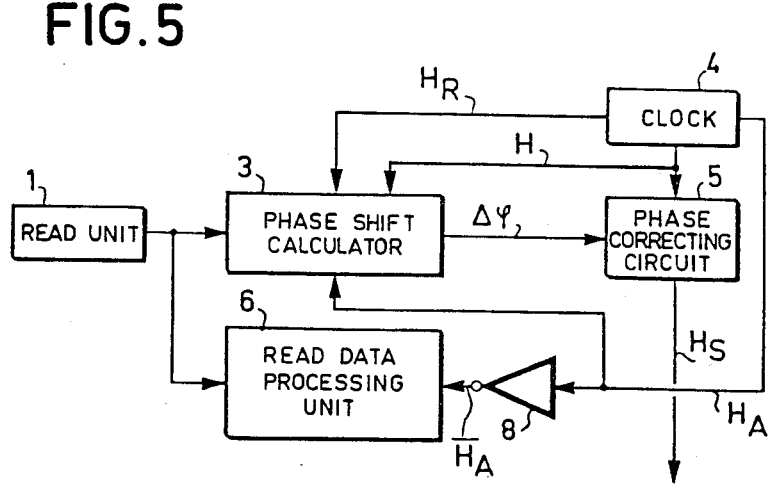

In this case, the device according to the invention is reduced to the simplified circuits shown in FIG. 5. There are no longer any flag detectors (FIG. 4: 2), the position thereof being known. The authorization—inhibiting signals can be derived from the clock signals, respectively $H_A$ and via inverter 8: $\overline{H}_A$. The other circuits are identical to those of FIG. 4 and will not be described again.

The various circuits of the devices according to FIGS. 5 and/or 4 will now be described in greater detail.

Figure 6:
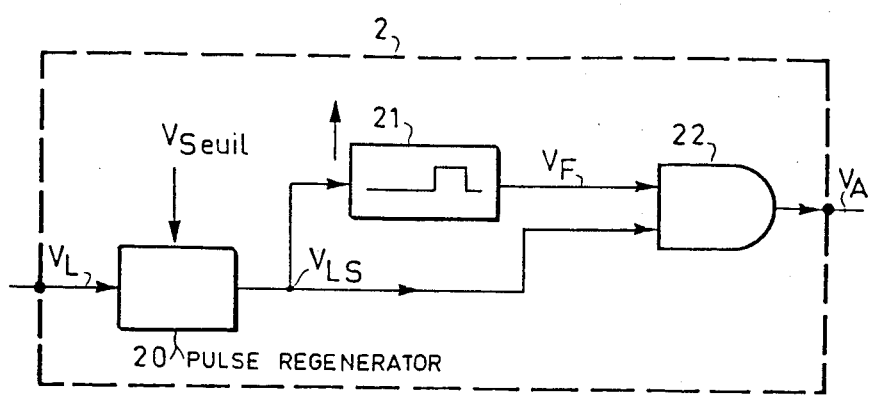
FIGS. 6 and 7 in a more detailed manner certain elements of these devices.

An example of a circuit for detecting flags and for determining the time of passage of a flag beneath the reading spot is illustrated in FIG. 6. This detector circuit comprises a first circuit 20 for reshaping the read signal $V_L$. It advantageously comprises a bistable element comparing a read signal $V_L$ with a threshold voltage $V_{THRESHOLD}$ supplying a pulse $V_{LS}$, e.g. at a logic state "1" when the read signal exceeds the threshold and at logic state 0 in the opposite case. This signal $V_{LS}$ is transmitted to a circuit 21 for generating a pulse signal defining a data or time window $V_F$.

Figure 8:
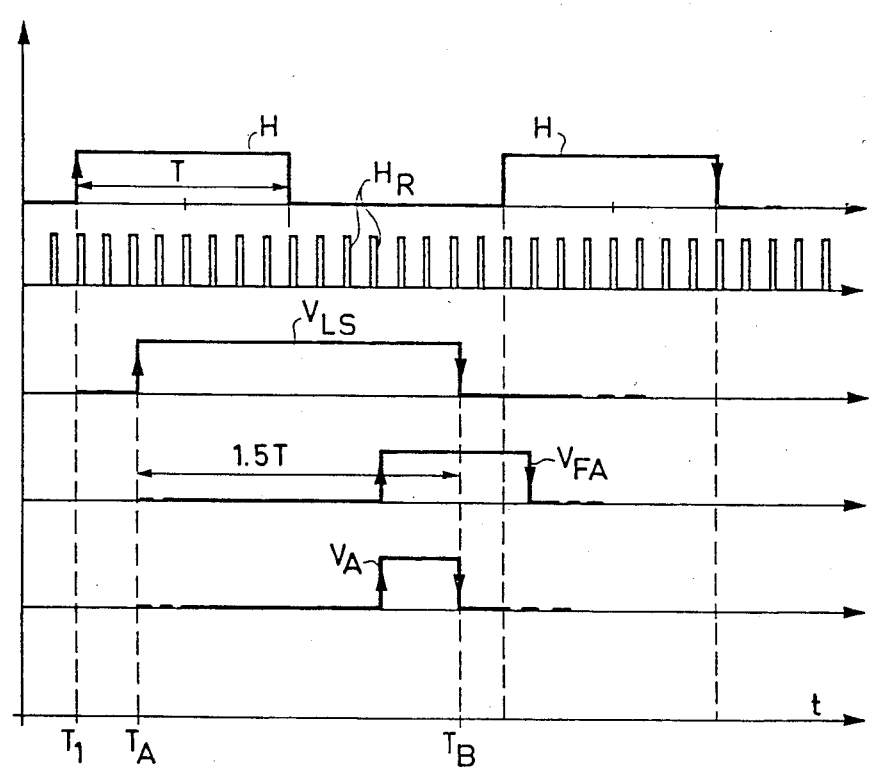
FIG. 8 a diagram showing the most significant signals of the operation of the device according to the invention, as well as their time interrelationships.

These signals are illustrated in FIG. 8. Curve H represents the pulses supplied by clocks 4 of basic duration T. Pulse signal $V_{LS}$ can have a phase shift compared with random clock signals modulo the period of these signals.

Circuit 21 is triggered by the rising front of the first flag pulse, at time $T_A$ on the diagram, and supplies a pulse $V_F$, whose centre is delayed by 1.5 T. For this purpose it is possible to use two monostable flip-flops generating pulses having respective durations slightly longer and slightly shorter than 1.5 T. The logic intersection of these two pulses can be used for determining the time window $V_F$.

The phase shift information $\alpha\phi$ can be obtained by comparison with a given time of the period of the basic clock signal H, in either digital or analog manner. Signal $\Delta\phi$ produced by the phase shift calculators can be in the form of a pulse signal having a transition in a given direction, whose appearance time represents the phase shift of the flag relative to a predetermined time of clock signals H, or a binary word whose address defines the phase shift.

According to a preferred variant, use is made of the clock signal H and a clock signal $H_R$, whose frequency is a multiple of the repetition rate of the basic clock signal H and is in fixed relationship therewith. The second clock signal can be easily derived from signal H with the aid of a frequency multiplier. For example, in the diagram of FIG. 8, clock signal $H_R$ has a repetition rate which is 16 times higher than that of signal H. Thus, it defines 16 subintervals. A decoder can supply a binary word $\Delta\phi$ representing the displacement of time $T_B$ relative to a fixed reference time of the period of the basic clock signal H, modulo 16. The binary word $\Delta\phi$ or control word is used for the phase correction, at each flag passage, of the clock signal used as the synchronizing signal $H_S$. This signal can be used during the reading of useful digital data between successive passages of two flags or when these flags are recorded beforehand, for the recording of data, in the form of preetchings, also for the writing of said data.

The new regenerated clock signals must be in constant phase relationship with the passage of the flags, i.e. for example with the rising front time $T_B$ of the flag pulse in the way in which it has been determined. The synchronizing signals $H_S$ have the same frequency as the clock signals H and a phase relationship which is dependent on the value of control word $\Delta\phi$.

Figure 7:
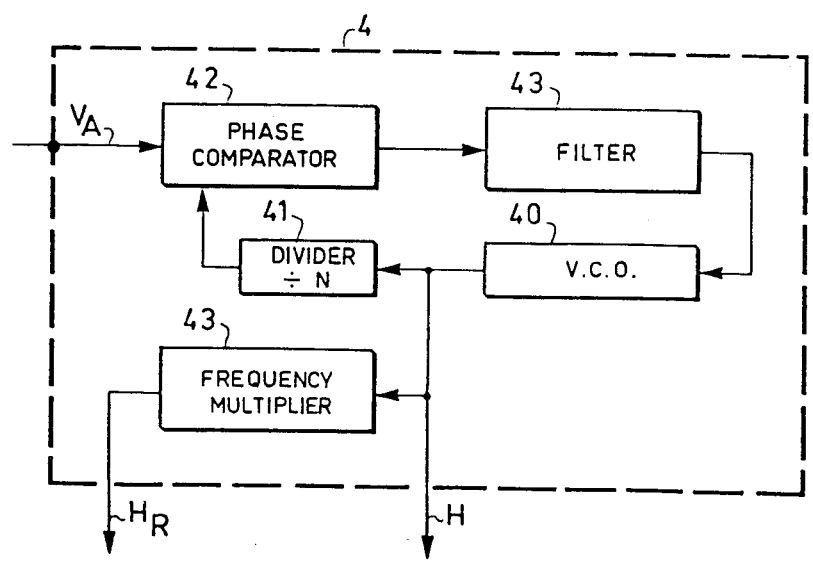

An embodiment of the clocks is shown in FIG. 7. They comprise a conventional quartz voltage-controlled oscillator, provided with a phase lock loop with in series a frequency divider 41 by a given number N, a phase comparator 42 receiving at a first input the output of divider 41 and on a second input the signals $V_A$ from the flag detector 2 and a low-pass filter 43. The output frequency H of the oscillator is made dependent on a multiple N of the timing of the flags passing beneath the reading spot.

The oscillator described hereinbefore is more particularly applicable to the circuits illustrated in FIG. 4. When the circuits of FIG. 5 are used, the oscillator can be reduced to a simpler expression, because phase comparison is no longer necessary. Finally, a clock signal $H_r$ with a frequency which is a multiple of the basic clock signal H can be generated on the basis of the latter with the aid of a frequency multiplier 44.

The phase correcting circuits 5 may also comprise a voltage-controlled oscillator, provided with a phase lock loop of the type described hereinbefore and which is frequency-controlled by clock signals H or a programmable delay line. The phase displacement on the flags is brought about with the aid of the control signal $\Delta\phi$.

Figure 9:
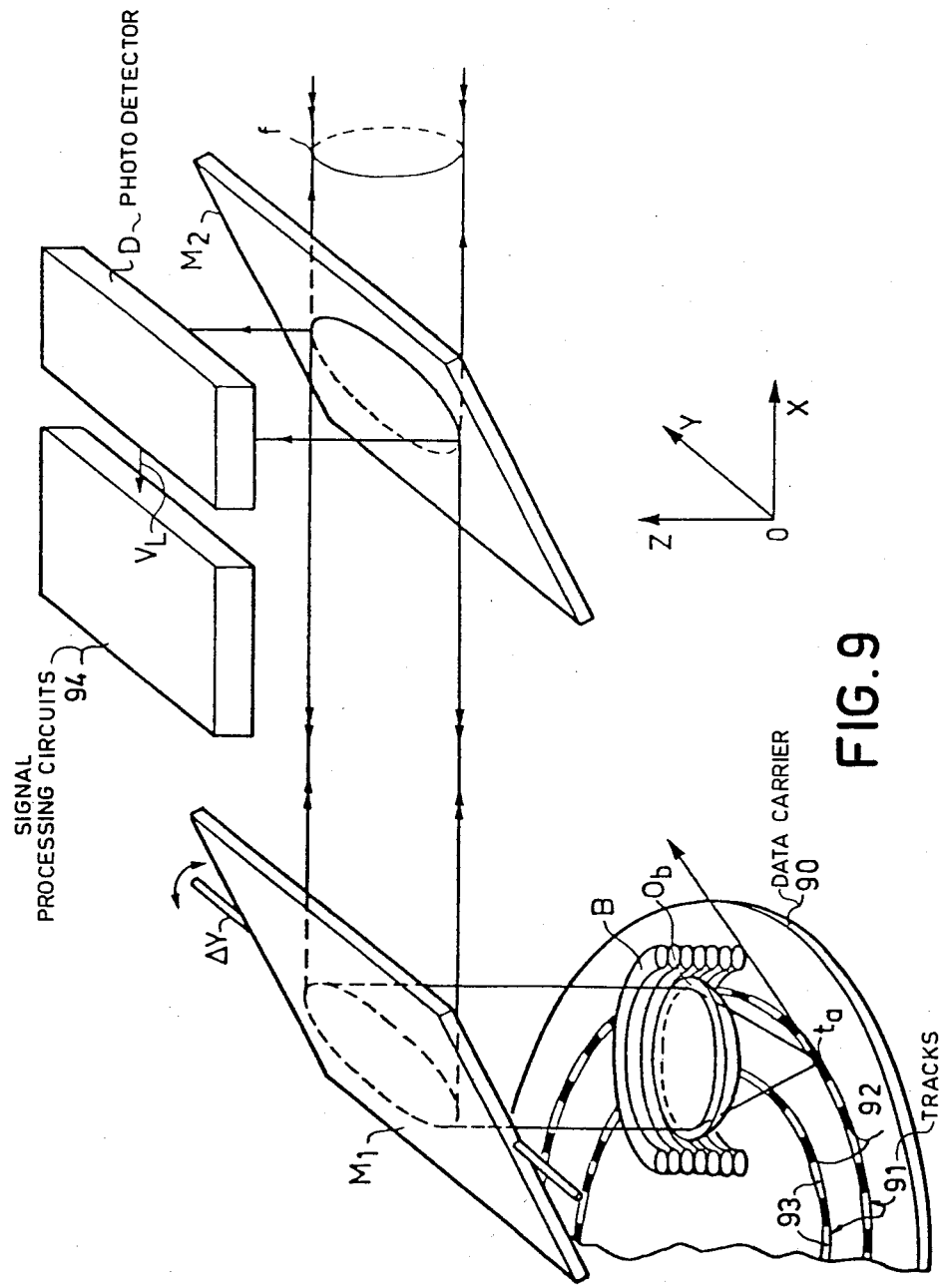
FIG. 9 diagrammatically, an optical write-read apparatus in which the device according to the invention can be used.

The present invention can be realized in numerous means for writing-reading on a data carrier in optical manner. For example FIG. 9 diagrammatically illustrates an apparatus for writing-reading on a carrier by the optical method in which the process of the present invention can be used. A disk 90 rotating in a plane XOY about an axis parallel to the third axis Z of the reference trihedron XYZ has on its upper face a layer of thermosensitive material in which the information is recorded along tracks 91. These tracks also have flags 92 associated with a specific code in the manner described hereinbefore. The useful digital data are recorded in preferably constant length areas 93 between these flags. The disk, which has a diameter of approximately 30 cm, is rotated and this rotary movement is imparted by a drive motor integral with the chassis of the optical read-write system. Typically the e.g. 40,000 tracks are recorded within a ring centred on the rotation axis and having a width equal to approximately 8 cm. The number of flags on the circular concentric tracks must be adequate to overcome parasitic phenomena linked with the nature of the carrier or the fluctuation of the rotation speed. Bearing in mind the information given hereinbefore, 3,500 flags are typically recorded.

In the embodiment of FIG. 9, the device giving access to a predetermined track on the disk comprises a fixed part having a not shown energy source generating a beam of parallel rays f and a movable part constituted by the actual read-write head. As is known, the latter comprises a microscope-type objective $O_b$, fixed to an electromagnetic coil B moving in the magnetic field of a not shown permanent magnet ensuring the vertical control of focusing and a galvanometer mirror $M_1$ ensuring the radial control. The galvanometer mirror $M_1$ moves about an axis $\Delta\phi$ parallel to axis OY of the reference trihedron, in such a way as to ensure the said radial control. Beam f is focused on a spot $t_a$ at a predetermined point on the disk on one of the aforementioned tracks 91. It is assumed here that the system is of the monobeam-monotrack type, i.e. a system in which the single beam f is alternately used for recording and reading, as well as for ensuring the radial following of the track and for focusing. This aspect falls outside the scope of the invention.

In order to detect the reading beam reflected by the disk, a semitransparent plate $M_2$ is, for example, placed on the path of the single beam f. The beam reflected by the disk is then detected by the photodetector means D, which generates signal $V_L$ to signal processing circuits 94. The latter more particularly comprise the circuitry according to the invention, e.g. the device described relative to FIG. 7.

The invention is also compatible with read-write means using more than one beam, e.g. a reading beam and a writing beam. In more general terms, the invention is not limited to the embodiments described relative to FIGS. 4 to 9.

Among other advantages, the invention makes it possible to take advantage of the independence existing between the coding of digital data representing the information and the synchronization, together with obtaining greater independence from information losses due to reading blanks, generally known as drop-outs.

What is claimed is:

1. A synchronizing signal generating process for use in a optical system performing the optical scanning of a reference surface of a data carrier with an illuminating spot, said system having clock means, means for causing said spot to scan any one of a plurality of track elements arranged on said reference surface, and optoelectronic detection means for sensing radiation modified by the optical interaction of said spot with synchronizing flag means repeatedly arranged along each one of said track elements, each of said flag means comprising at least one recorded synchronizing mark having in the direction of scanning a front edge and a rear edge, said process comprising the steps of:

extracting from a pulsed electric signal supplied by said optoelectronic detection means a trailing edge corresponding to the scanning by said spot of said rear edge, said extracting being controlled by a leading edge corresponding to the scanning by said spot of said front edge;

determining with reference to a time scale provided by said clock means a time value representative of the occurrence of said trailing edge; and deriving from said time scale a further time scale resynchronized under the control of said time value.

2. A synchronizing signal generating process for use in an optical system performing the optical scanning of a reference surface of a data carrier with an illuminating spot, said system having clock means, means for causing said spot to scan any one of a plurality of track elements arranged on said reference surface, and optoelectronic detection means for sensing radiation modified by the optical interaction of said spot with synchronizing flag means repeatedly arranged along each one of said track elements, each of said flag means comprising at least one recorded synchronizing mark having in the direction of scanning a front edge and a rear edge, said process comprising the steps of:

extracting from a pulsed electric signal supplied by said optoelectronic detection means a trailing edge corresponding to the scanning by said spot of said rear edge, said extracting being controlled by a leading edge corresponding to the scanning by said spot of said front edge; and synchronizing the frequency of operation of said clock means with the recurrence frequency of said trailing edge.

3. A process as claimed in claim 2, further comprising the step of determining with reference to a time scale provided by said clock means a time value representative of the occurrence of said trailing edge, and deriving from said time scale a further time scale resynchronized under the control of said time value.

4. A data carrier having on a reference surface a plurality of adjacent track elements for digital data storage in alloted non-contiguous portions of said track elements, said data carrier comprising:

flag means repeatedly arranged along each one of said track elements and intermediate said non-contiguous portions for producing specific synchronizing signals in response to the lengthwise scanning thereof with an illuminating spot;

each of said flag means comprising at least one recorded synchronizing mark having in the direction of scanning a front edge and a rear edge defining a mark length substantially equal to half an odd multiple of a predetermined unit length;

said digital data being recorded using a modulation code trimmed to said unit length;

said flag means having transitions forbidden in said modulation code, thereby preventing said synchronizing signals from being produced in response to the scanning of said digital data.

5. A data carrier as claimed in claim 4, wherein said mark length is one and one-half times said unit length.

6. A data carrier as claimed in any one of claims 4 or 5, wherein said mark is prerecorded.

7. A data carrier as claimed in any one of claims 4 or 5, wherein said mark is simultaneously recorded with said digital data.

8. A data carrier as claimed in claim 4, wherein said flag means are uniformly spaced along said track elements.

9. A synchronizing signal generator device for use in an optical system performing the optical scanning of a reference surface of a data carrier with an illuminating spot:

said system comprising clock means, means for causing said spot to scan any one of a plurality of track elements arranged in said reference surface, an optoelectronic detection means for sensing radiation modified by the optical interaction of said spot with synchronizing flag means repeatedly arranged along each one of said track elements, each of said flag means comprising at least one recorded synchronizing mark having in the direction of scanning a front edge and a rear edge;

said device comprising:

signal extraction means receiving an electric signal from said optoelectronic detection means for extracting therefrom a trailing edge portion corresponding to the scanning by said spot of said rear edge; and frequency synchronizing means controlled with said trailing edge.

10. A synchronizing signal generator device for use in an optical system performing the optical scanning of a reference surface of a data carrier with an illuminating spot:

said system having clock means, means for causing said spots to scan any one of a plurality of track elements arranged on said reference surface and optoelectronic detection means for sensing radiation modified by the optical interaction of said spot with synchronizing flag means repeatedly arranged on each one of said track elements, each of said flag means comprising at least one recorded synchronizing mark having in the direction of scanning a front edge and a rear edge;

said device comprising:

signal extracting means receiving an electric signal from said optoelectronic detection means for extracting therefrom a trailing edge portion corresponding to the scanning by said spot of said rear edge;

means for determining with reference to a time scale waveform provided by said clock means a time value representative of the occurrence of said trailing edge portion; and resynchronization means receiving said time scale waveform and said time value for generating a further time scale waveform resynchronized under the control of said time value.

11. A device as claimed in any one of claims 9 or 10, wherein said signal extracting means comprises:

threshold shaping means receiving said electric signal; and gating means having an input for receiving a reshaped waveform supplied from said threshold shaping means and a further input fed with a delayed sampling window signal triggered by a transition of said reshaped waveform which is produced in response to the scanning with said spot of said front edge;

said gating means having an output delivering said trailing edge portion.

* * * * *